US012593005B2

(12) United States Patent
Ho

(10) Patent No.: US 12,593,005 B2
(45) Date of Patent: Mar. 31, 2026

(54) VIDEO CONFERENCE DEVICE

(71) Applicant: OXTI Pte Ltd, Singapore (SG)

(72) Inventor: Chih-Feng Ho, Singapore (SG)

(73) Assignee: OXTI PTE LTD, Singapore (SG)

( * ) Notice: Subject to any disclaimer, the term of this patent is extended or adjusted under 35 U.S.C. 154(b) by 168 days.

(21) Appl. No.: 18/423,271

(22) Filed: Jan. 25, 2024

(65) Prior Publication Data

US 2025/0247498 A1     Jul. 31, 2025

(51) Int. Cl.
*H04N 7/14*          (2006.01)
*H04N 7/15*          (2006.01)

(52) U.S. Cl.
CPC .............. *H04N 7/142* (2013.01); *H04N 7/15* (2013.01)

(58) Field of Classification Search
CPC .... B66F 7/0625; H04L 65/403; H04M 3/567; H04N 7/14; H04N 7/142; H04N 7/147; H04N 7/15; H04N 13/349; H04N 23/695; H04N 23/631; B29C 45/14065; B65C 9/02; C03B 11/005; E04G 19/00; G02B 7/1822; G05B 19/128; G06F 3/0416; G06F 3/04883

See application file for complete search history.

(56) References Cited

U.S. PATENT DOCUMENTS

| | | | | |
|---|---|---|---|---|
| 8,471,889 B1 * | 6/2013 | Lee | ........................ | H04L 65/403 |
| | | | | 715/764 |
| 9,270,941 B1 * | 2/2016 | Lavelle | ................ | H04N 23/695 |
| 9,398,258 B1 * | 7/2016 | Sandvik | ................... | H04N 7/15 |
| 9,462,223 B2 * | 10/2016 | White | ........................ | H04N 7/14 |
| 10,793,409 B2 * | 10/2020 | Unger | ........................ | B66F 7/16 |
| 2005/0242169 A1 * | 11/2005 | Michal | ................. | G05B 19/128 |
| | | | | 235/375 |
| 2010/0283828 A1 * | 11/2010 | Lee | ....................... | H04N 13/349 |
| | | | | 348/14.08 |
| 2012/0038742 A1 * | 2/2012 | Robinson | ................. | H04N 7/15 |
| | | | | 348/E7.083 |
| 2013/0002105 A1 * | 1/2013 | Yeh | ................... | B29C 45/14065 |
| | | | | 264/405 |
| 2013/0312893 A1 * | 11/2013 | Austermeier | ............. | B65C 9/02 |
| | | | | 156/60 |
| 2014/0043676 A1 * | 2/2014 | Lambert | .............. | G02B 7/1822 |
| | | | | 359/857 |

(Continued)

*Primary Examiner* — Gerald Gauthier
(74) *Attorney, Agent, or Firm* — Leong C. Lei

(57)          ABSTRACT

A video conference device, includes a display device, the display device provided with a displayer, support seat and control module, the control module including a transmitting and receiving module, touch circuit, and transmission device, the transmitting and receiving module in electric connection with the displayer, the displayer in electric connection with the transmission device, the touch circuit in in electric connection with the transmission device, the displayer provided with a lens and sound device, the displayer provided with a plurality of display screens, a support frame provided between the support seat and displayer, the support frame respectively in connection with the support seat and displayer, and the support frame provided with a press lifting device, no one will be unable to fully view the content on the display device due to a blind spot, and there will be no neck pain caused by keeping looking up at the displayer.

6 Claims, 8 Drawing Sheets

(56) References Cited

U.S. PATENT DOCUMENTS

| 2014/0085402 A1* | 3/2014 | Wang ....................... H04N 7/15 |
| | | 348/14.07 |
| 2017/0277347 A1* | 9/2017 | Li ......................... G06F 3/0416 |
| 2018/0124354 A1* | 5/2018 | Aarrestad .............. H04N 7/147 |
| 2019/0016575 A1* | 1/2019 | Unger ................... B66F 7/0625 |
| 2020/0356248 A1* | 11/2020 | Demasco ............ G06F 3/04883 |
| 2021/0203884 A1* | 7/2021 | You ....................... H04M 3/567 |
| 2021/0367985 A1* | 11/2021 | Bansal ................. H04L 65/403 |
| 2022/0224736 A1* | 7/2022 | Cheevers ............... H04N 7/147 |
| 2024/0343630 A1* | 10/2024 | Füller ................. C03B 11/005 |
| 2025/0113095 A1* | 4/2025 | Alonso ............... H04N 23/631 |
| 2025/0188754 A1* | 6/2025 | Sturm .................... E04G 19/00 |
| 2025/0247498 A1* | 7/2025 | Ho ......................... H04N 7/15 |

* cited by examiner

VIDEO CONFERENCE DEVICE

(a) TECHNICAL FIELD OF THE INVENTION

The present invention relates to an electronic device, and more particularly to a video conference device.

(b) DESCRIPTION OF THE PRIOR ART

As FIG. 1 shows, generally only one screen 10 may be presented during a conference, such that it is easy to create blind spots during the conference, which causes somebody to be unable to clearly see the content on the screen 10 and some information to be possibly lost. In addition, looking up at the screen 10 all the time can easily cause neck pain, or everyone will bring their own laptops to the meeting, so they have to bring the laptops into the meeting room and then take the laptops back to their office locations when leaving, which is very troublesome.

SUMMARY OF THE INVENTION

To overcome the above disadvantages present invention proposes a video conference device, including a display device, the display device provided with a displayer, support seat and control module, the control module including a transmitting and receiving module, touch circuit, and transmission device, the transmitting and receiving module in electric connection with the displayer, the displayer in electric connection with the transmission device, the touch circuit in in electric connection with the transmission device, the displayer provided with a lens and sound device, the displayer provided with a plurality of display screens, a support frame provided between the support seat and displayer, the support frame respectively in connection with the support seat and displayer, and the support frame provided with a press lifting device.

With the above combination, the present invention allows multiple persons to completely view the contents of the display device, and allows the press lifting device to control the height of the displayer to increase the range of the displayer that can be seen. In addition, the present invention is provided with the multiple display screens, so that no one will be unable to fully view the content on the display device due to a blind spot, and there will be no neck pain caused by looking up at the displayer all the time, and there is no need to carry a laptop in and out of the conference room.

DETAILED DESCRIPTION OF THE PREFERRED EMBODIMENTS

Figure 1:
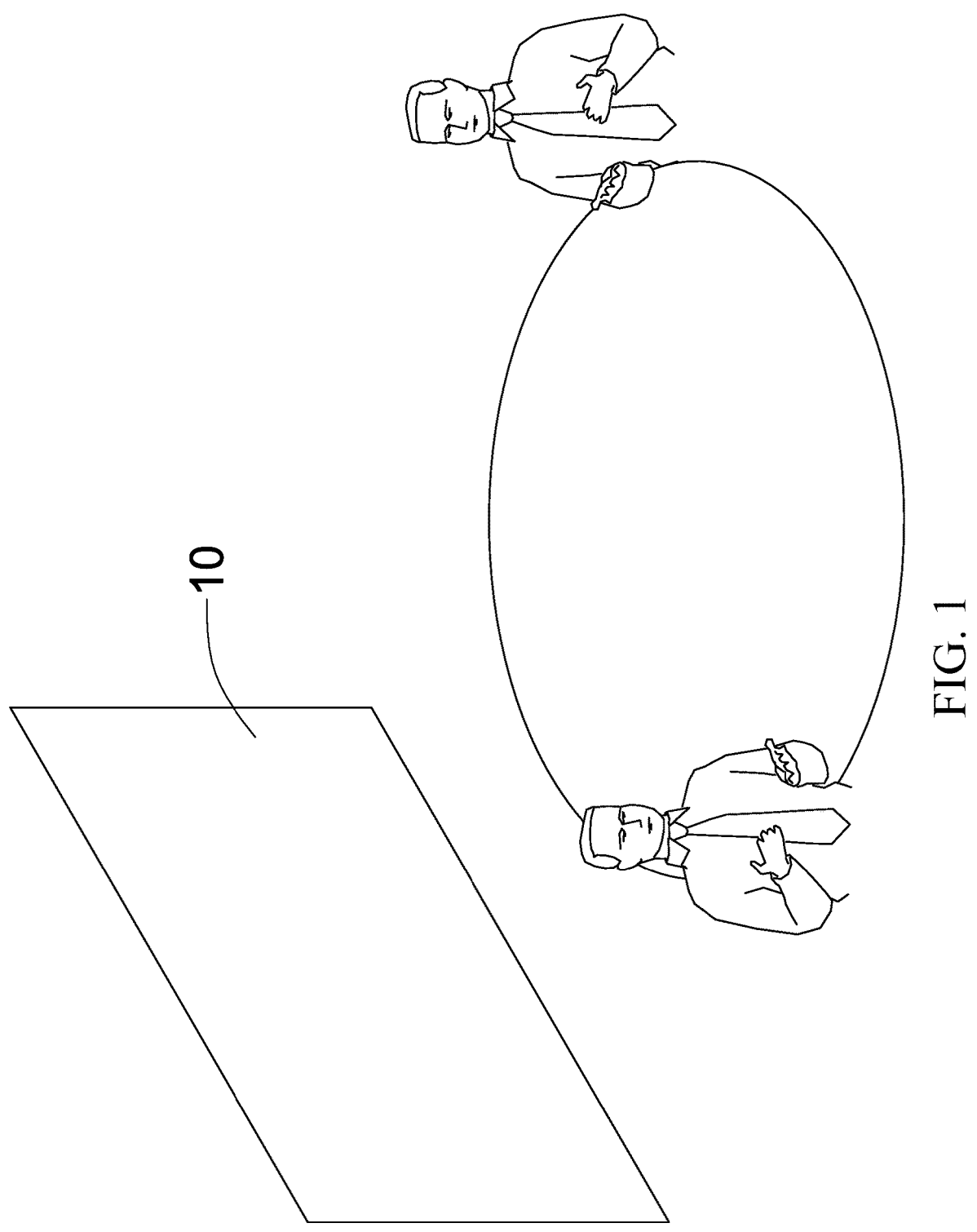
FIG. 1 is a schematic view of a conventional video conference device.
Figure 2:
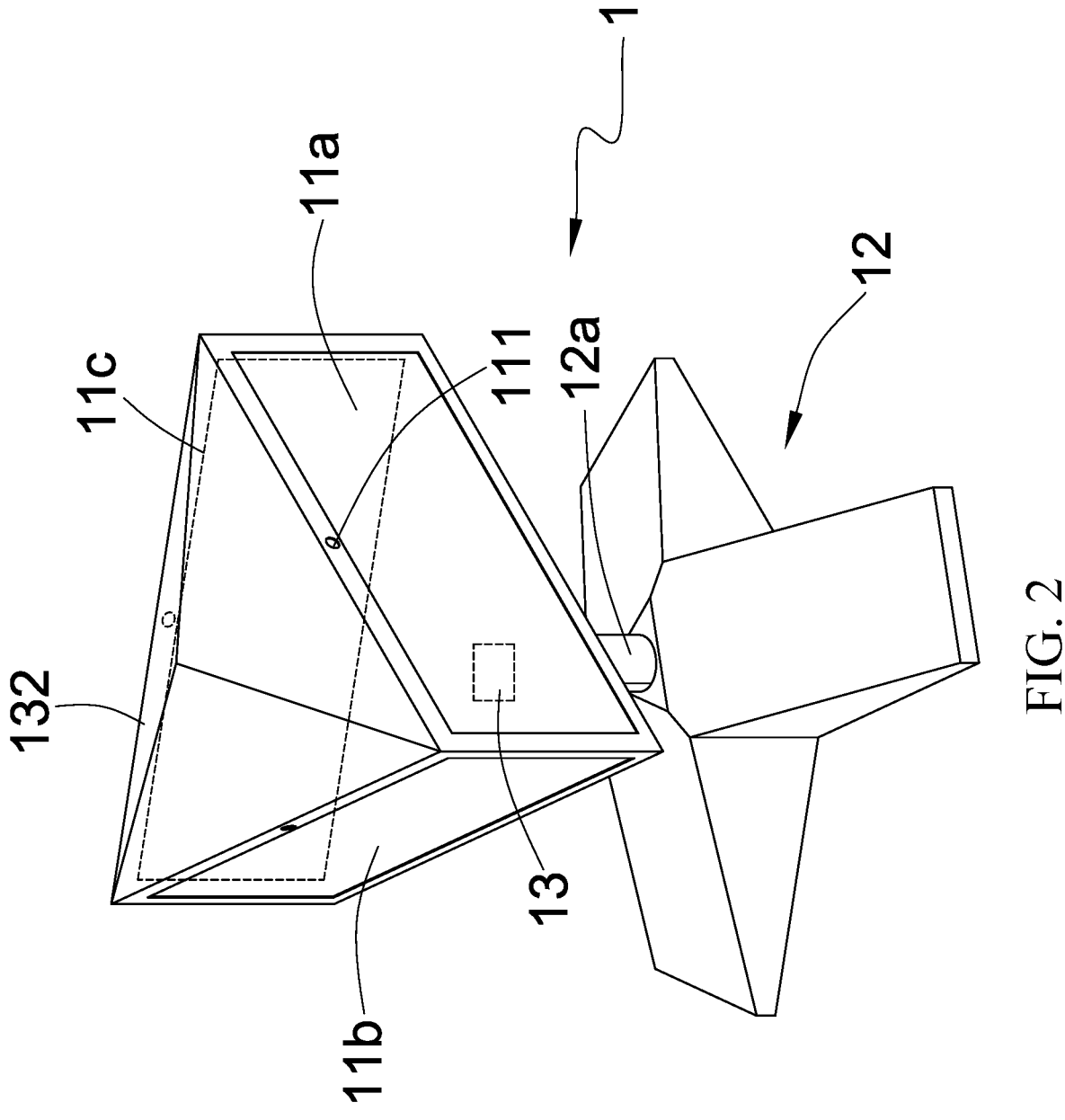
FIG. 2 is a perspective view of the present invention.
Figure 3:
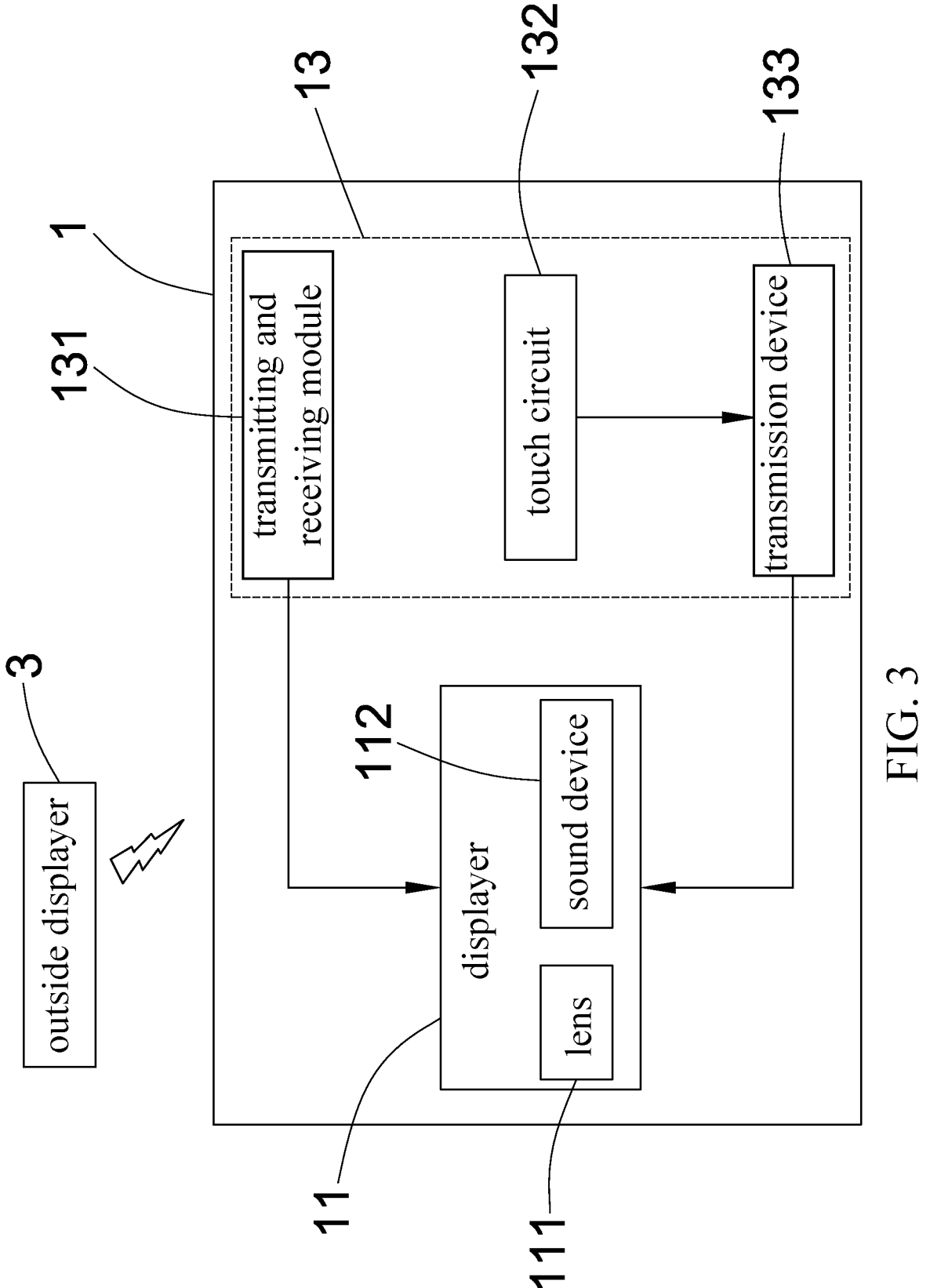
FIG. 3 is a block diagram of a control module of the present invention.
Figure 4:
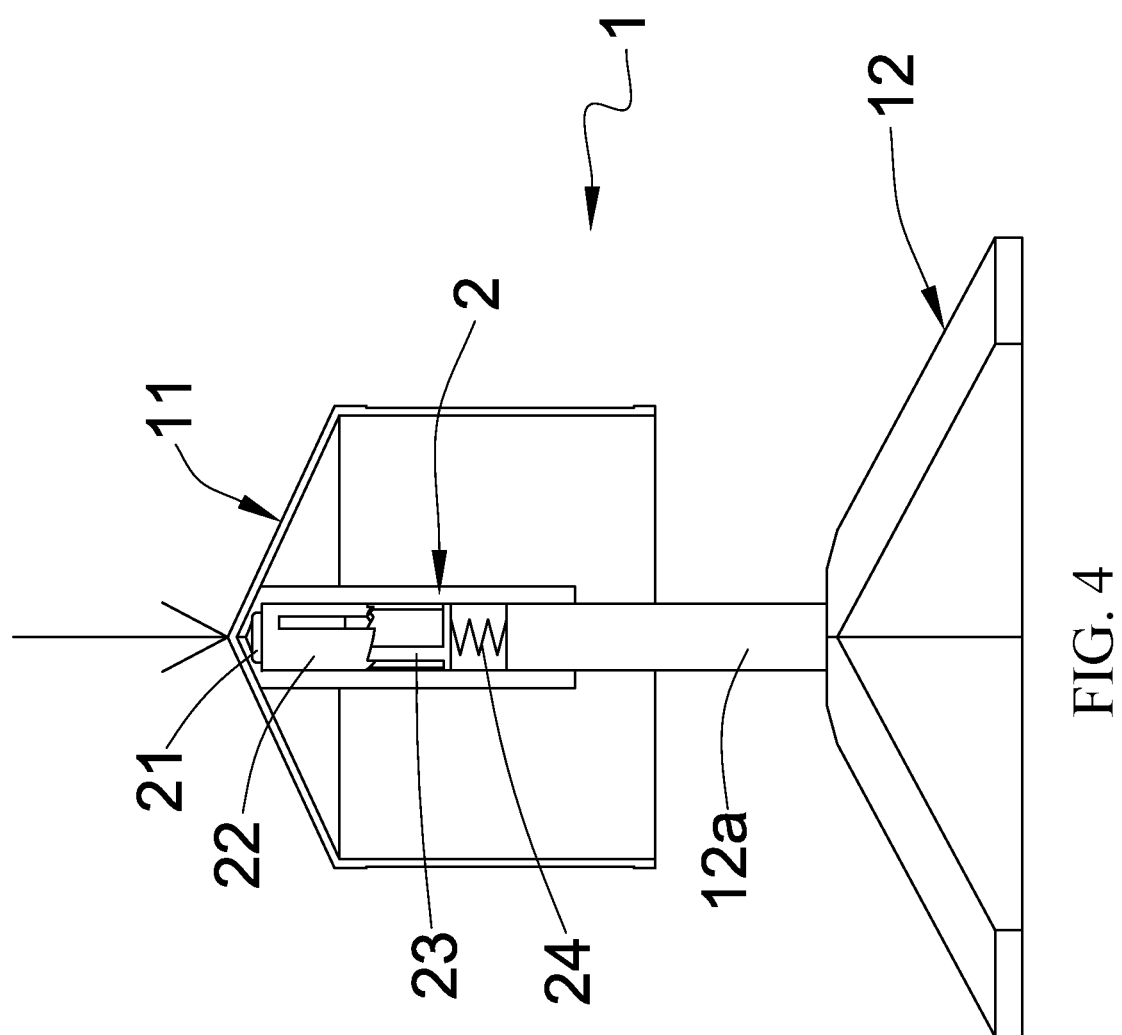
FIG. 4 shows an action of pressing to lower a displayer.

Referring to FIGS. 2 3 and 4, a video conference device of the present invention includes a display device 1, press lifting device 2.

The display device 1 is provided with a displayer 11, support seat 12 and control module 13, where the control module 13 includes a transmitting and receiving module 131, touch circuit 132, transmission device 133, where the transmitting and receiving module 131 is in electric connection with the displayer 11, the displayer 11 is in electric connection with the transmission device 133, and the touch circuit 132 is in electric connection with the transmission device 133. Furthermore, the displayer 11 is provided with a lens 111 and sound device 112, and the displayer 11 is provided with a plurality of display screens which are a first display screen 11a, second display screen 11b and third display screen 11c. Furthermore, between the support seat 12 and displayer 11 is provided with a support frame 12a, which is respectively connected to the support seat 12 and displayer 11, and the support frame 12a is provided with the press lifting device 2, as shown in FIG. 4.

Figure 5:
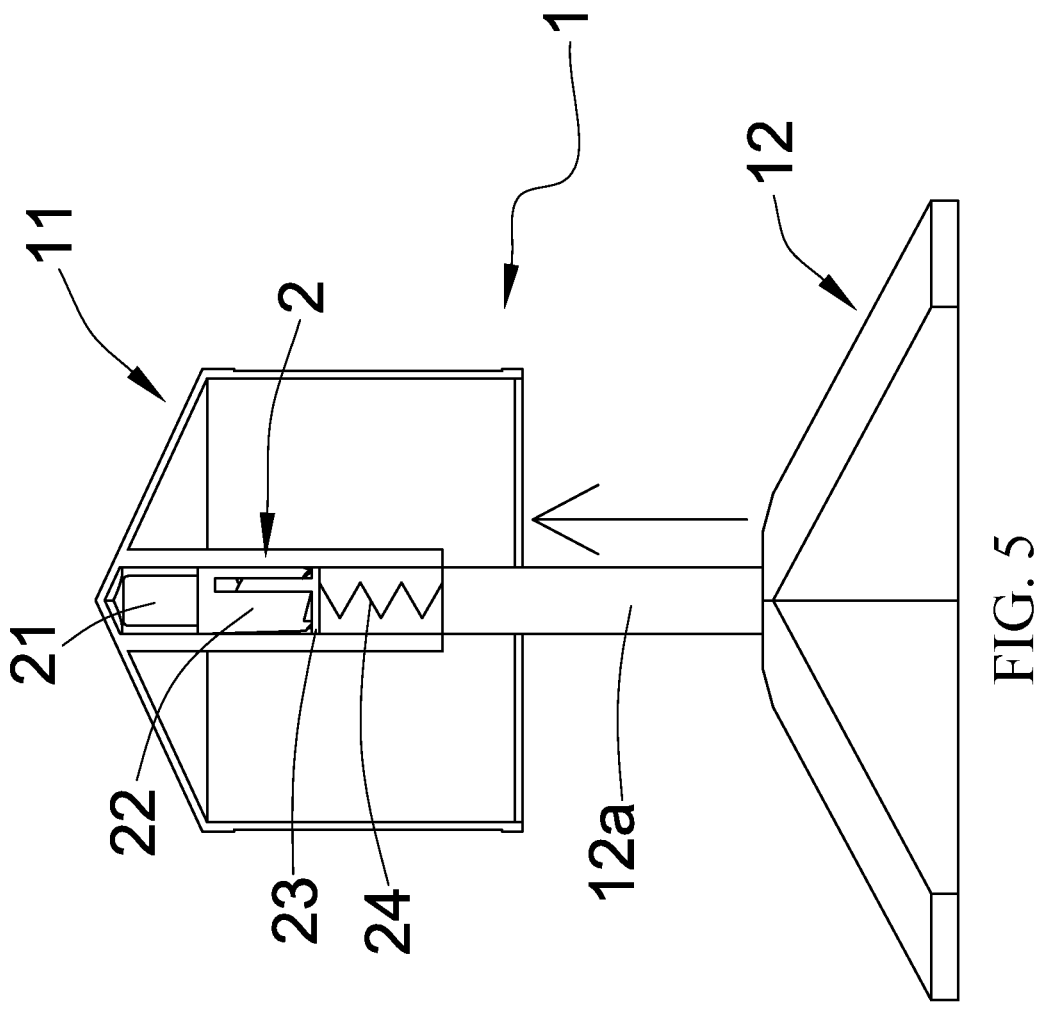
FIG. 5 shows an action of pressing to lift the displayer.
Figure 6:
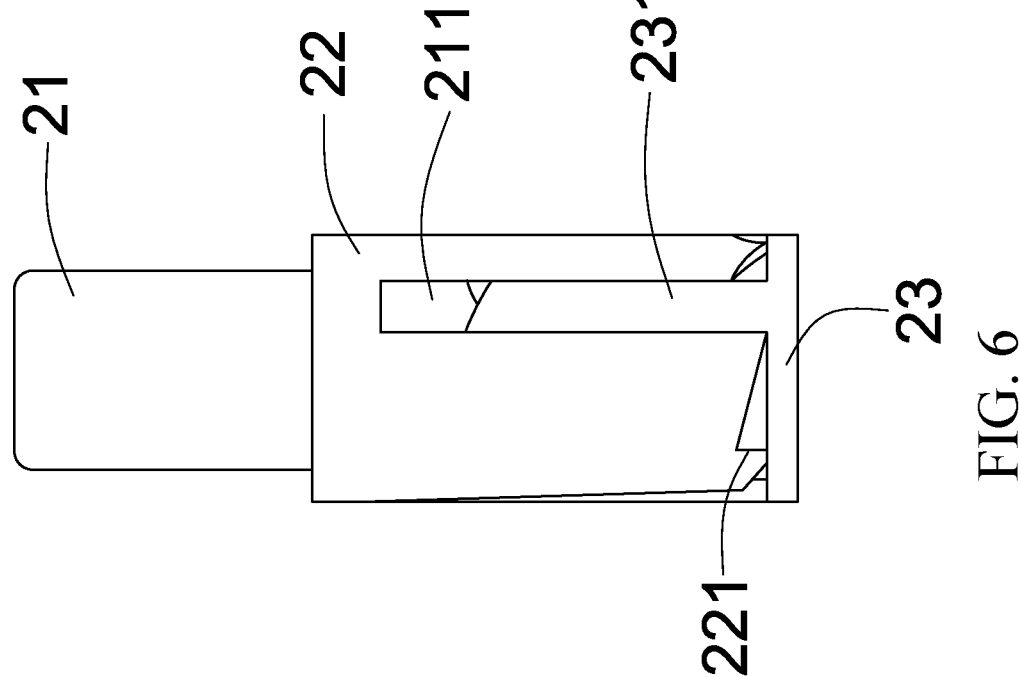
FIG. 6 is a schematic view of a press lifting device of the present invention.

Referring to FIGS. 5 and 6, the press lifting device 2 is provided with a press part 21, slide groove 22, rotating disk 23 and elastic element 24, where the press part 21 is provided with a guide element 211, the slide groove 22 is provided with a resistance part 221, the rotating disk 23 is provided with a convex part 231 in connection with the guide element 211, and the convex part 231 is stuck in the slide groove 22. Furthermore, one end of the elastic element 241 is in connection with the rotating disk 23, and another end thereof is fixed inside the displayer 11. When the press part 21 is pressed, the convex part 231 will be pushed to move outward, and when the convex part 231 leaves the slide groove 22, it will be affected by the guide element 211 to turn the rotating disk 23, allowing the convex part 231 to be stuck in the resistance part 221, thereby lowering the displayer 11, as shown in FIG. 4. Furthermore, when the press part 21 is pressed once more, the rotating disk 23 will be turned again, allowing the convex part 231 to enter the slide groove 22 again combined with the thrust of the elastic element 24, thereby lifting the displayer 11, as shown in FIG. 5. Therefore, the height of the displayer 11 can be easily adjusted through the press lifting device 2 to increase the visible range of the displayer 11.

Furthermore, the displayer 11 is in the shape of a triangular pyramid.

Furthermore, the display device 1 may be in electric connection with an outside displayer 3, allowing the images on the displayer 11 to be displayed on the outside displayer 3 as shown in FIG. 3.

Figure 7:
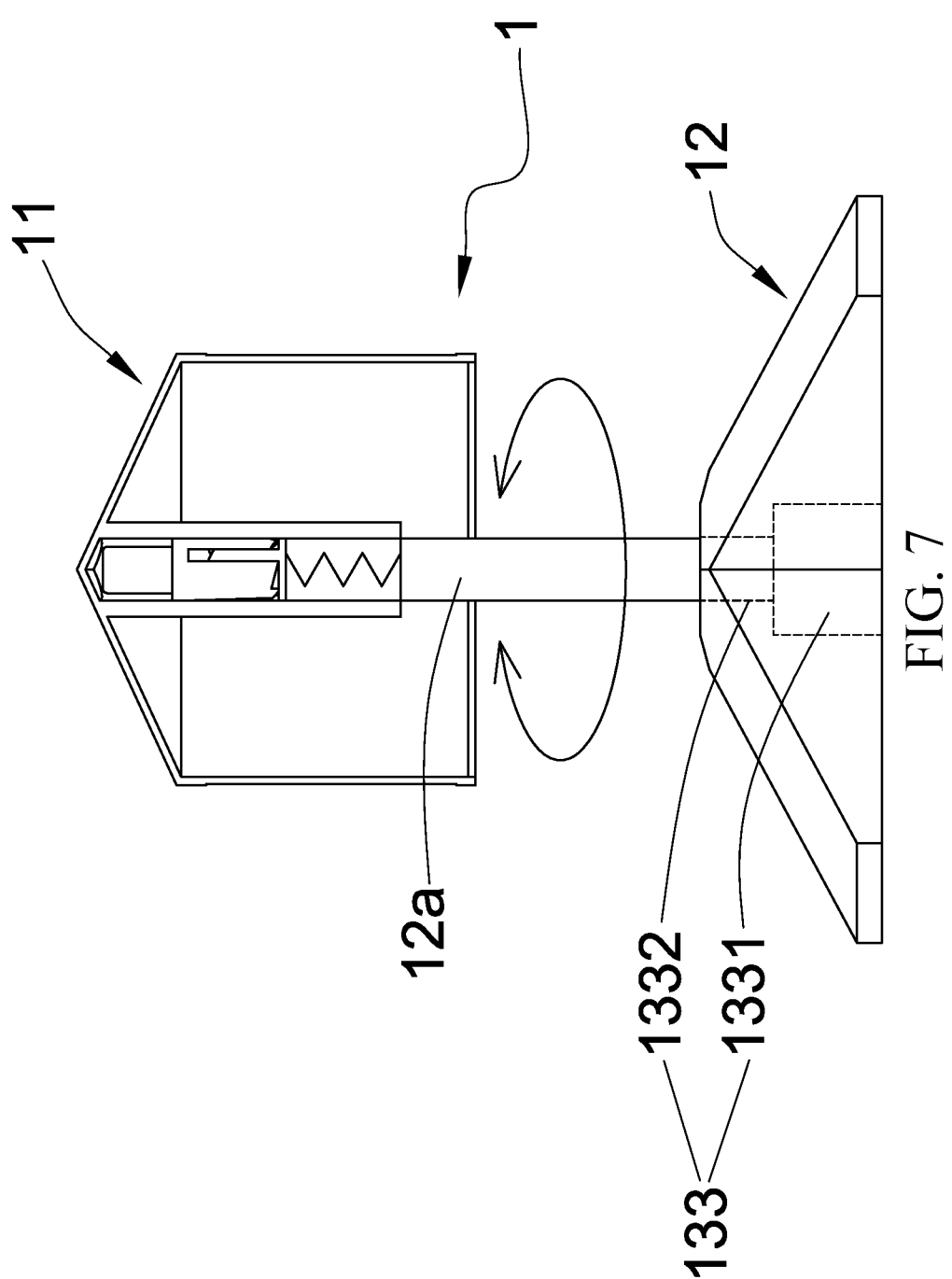
FIG. 7 is a schematic view of a transmission device of the present invention.

Furthermore, the transmission device 133 includes a motor 1331 and a connecting rod 1332 in connection therewith, and the connecting rod 1332 is in connection with the support frame 12a, so that the transmission device 133 can make the displayer 11 turn, as shown in FIG. 7.

Furthermore, the touch circuit 132 may be configured on the top surface of the displayer 11, as shown in FIG. 2.

Furthermore, when the touch circuit 132 is touched, the transmission device 133 will be started to turn the displayer 11 so that the lens 111 faces the direction that the touch circuit 132 is touched.

Figure 8:
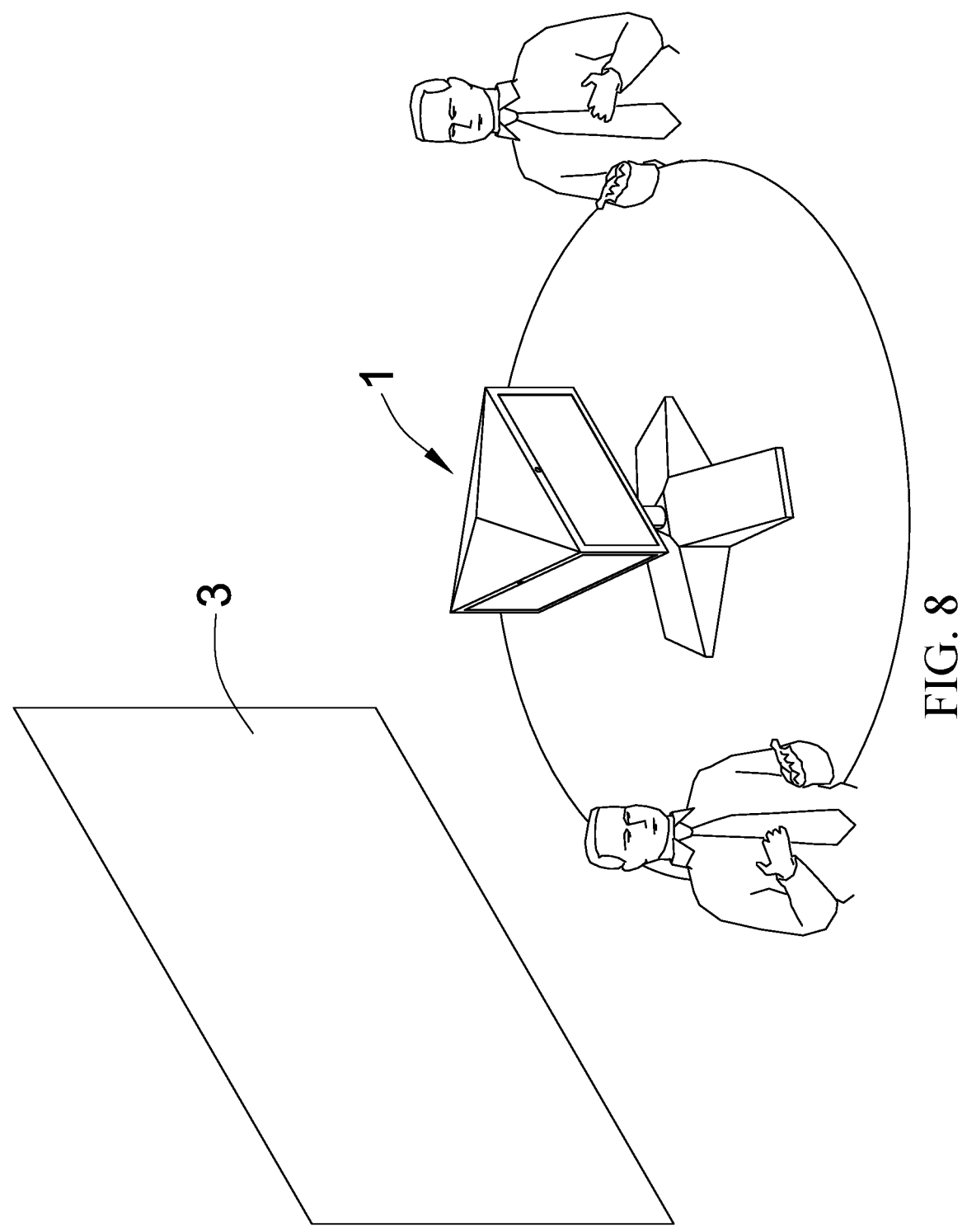
FIG. 8 is schematic view of the present invention in a practical implementation state.

Referring to FIGS. 2, 3 and 8, when there is a need to have a video conference with remote clients or colleagues, the image and sound signals from the other end can be received through the transmitting and receiving module 131. Thereafter, the images and sounds are played out through the displayer 11 and sound device 112, and the images and sounds recorded on site through the lens 111 and sound device 112 are then transmitted to the persons conducting the meeting remotely through the transmitting and receiving module 131, which can also play out the images recorded on site from the display screens, and can also allow the displayer 11 to make the lens 111 turned to the person touching the touch circuit 132 through the transmission device 133 by touching the touch circuit 133, allowing the person touching the touch circuit 132 to be clearly displayed on the displayer 11 when speaking.

With the above combination, the present invention allows multiple persons to completely view the contents of the display device 1, and allows the press lifting device 2 to control the height of the displayer 11 to increase the range of the displayer 11 that can be seen. In addition, the present invention is provided with the multiple display screens, so that no one will be unable to fully view the content on the display device 1 due to a blind spot, and there will be no neck pain caused by looking up at the displayer 11 all the time, and there is no need to carry a laptop in and out of the conference room.

I claim:

1. A video conference device, comprising a display device, said display device provided with a displayer, support seat and control module, said control module comprising a transmitting and receiving module, touch circuit, and transmission device, said transmitting and receiving module in electric connection with said displayer, said displayer in electric connection with said transmission device, said touch circuit in in electric connection with said transmission device, said displayer provided with a lens and sound device, said displayer provided with a plurality of display screens, a support frame provided between said support seat and displayer, said support frame respectively in connection with said support seat and displayer, and said support frame provided with a press lifting device; wherein said press lifting device is provided with a press part, slide groove, rotating disk and elastic element, said press part is provided with a guide element, said slide groove is provided with a resistance part, said rotating disk is provided with a convex part, said convex part is in connection with said guide element, said convex part is stuck in said slide groove, one end of said elastic element is in connection with said rotating disk, and another end thereof is fixed inside said displayer.

2. The video conference device according to claim 1, wherein said press lifting device is provided with a press part, slide groove, rotating disk and elastic element, said press part is provided with a guide element, said slide groove is provided with a resistance part, said rotating disk is provided with a convex part, said convex part is in connection with said guide element, said convex part is stuck in said slide groove, one end of said elastic element is in connection with said rotating disk, and another end thereof is fixed inside said displayer.

3. The video conference device according to claim 1, wherein said displayer is in a shape of a triangular pyramid.

4. The video conference device according to claim 1, wherein said touch circuit is provided on the top surface of said displayer.

5. The video conference device according to claim 1, wherein said transmission device is a motor and connecting rod, said motor is in connection with said connecting rod, and said connecting rod is in connection with said support frame.

6. The video conference device according to claim 1, wherein said touch circuit is provided on the top surface of said displayer.

* * * * *